Aug. 26, 1969  F. R. NEFF  3,463,331
AUTOMATIC ASSEMBLY MACHINE
Filed April 12, 1968  3 Sheets-Sheet 1
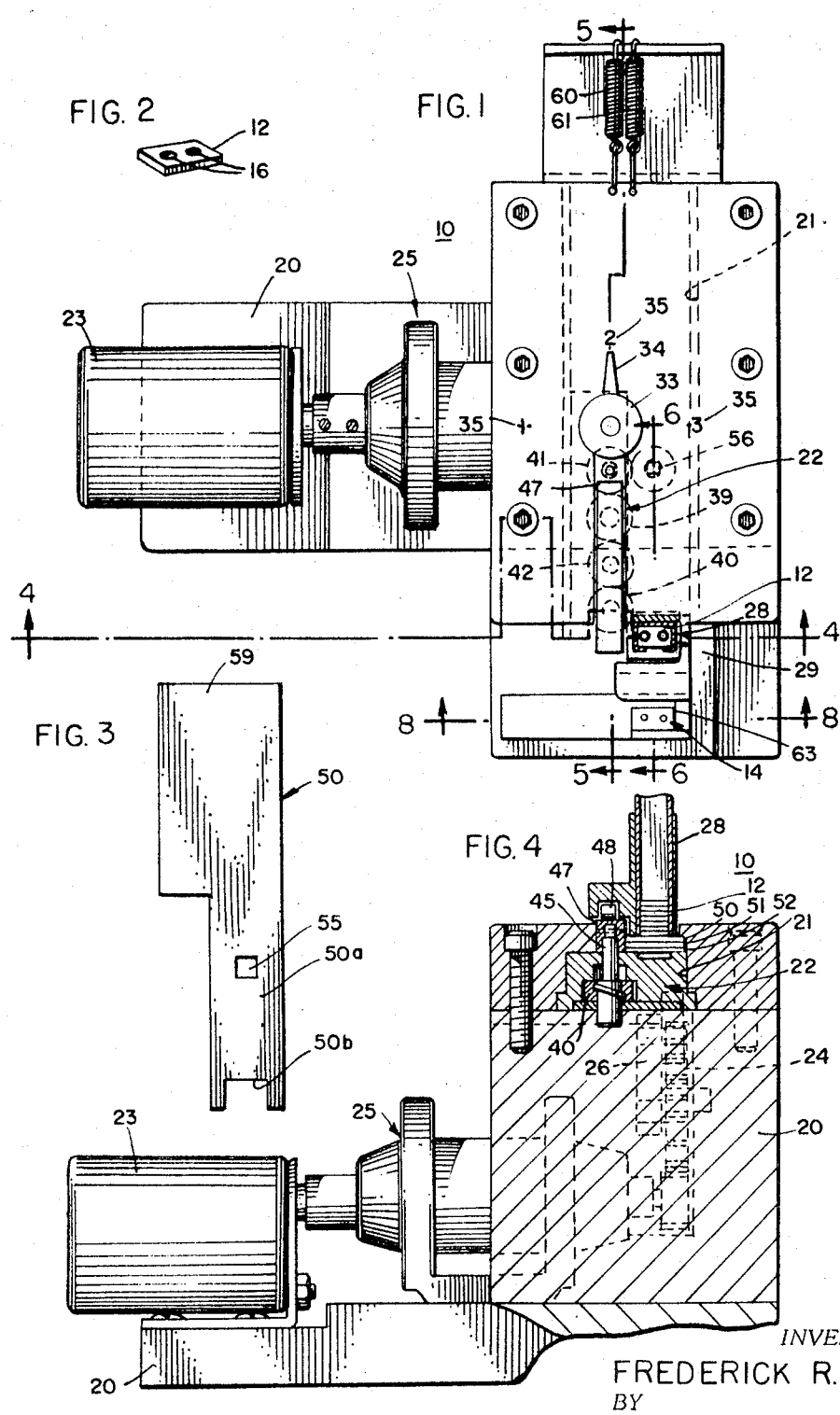
INVENTOR:
FREDERICK R. NEFF
BY
Mason, Kolehmainen, Rathburn & Wyss
ATT'YS Aug. 26, 1969  F. R. NEFF  3,463,331
AUTOMATIC ASSEMBLY MACHINE Filed April 12, 1968  3 Sheets-Sheet 2

INVENTOR:
FREDERICK R. NEFF
BY
ATT'YS

Aug. 26, 1969        F. R. NEFF        3,463,331
AUTOMATIC ASSEMBLY MACHINE
Filed April 12, 1968        3 Sheets-Sheet 3
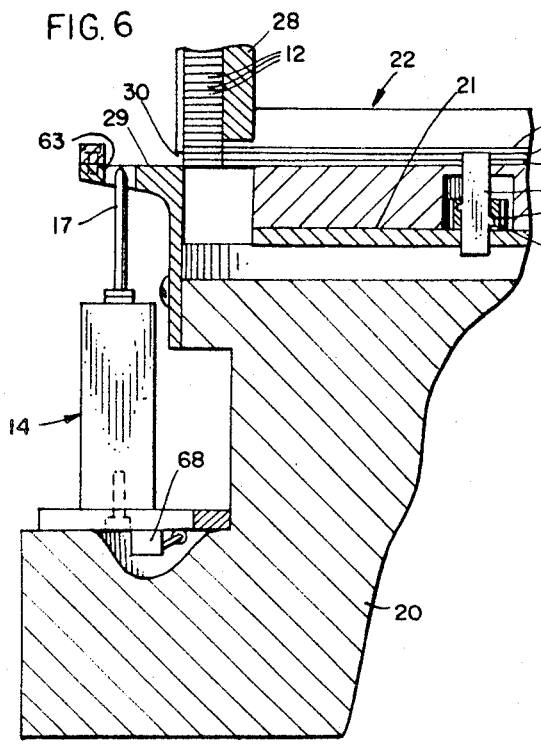
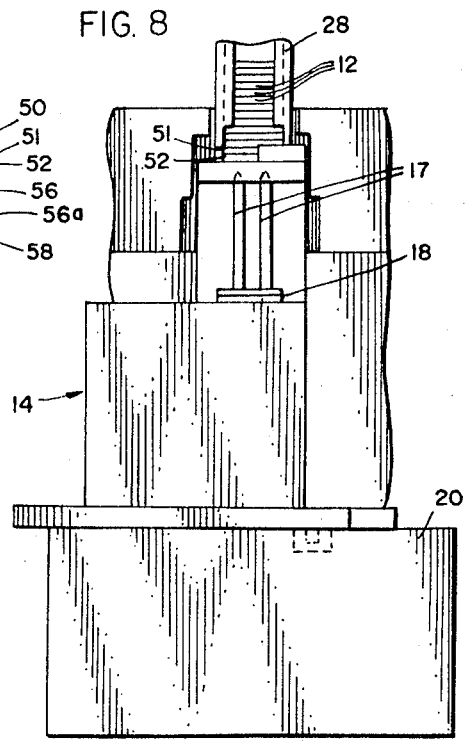
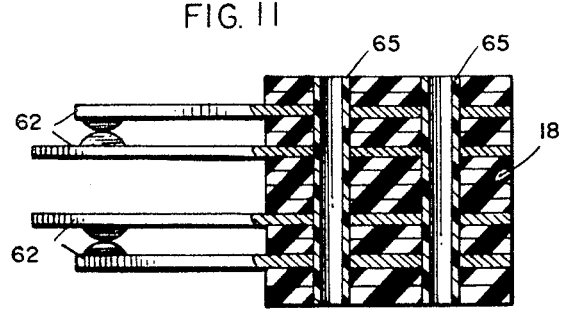
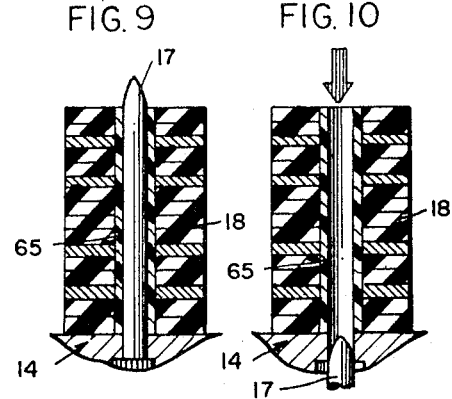
INVENTOR:
FREDERICK R. NEFF
BY
ATT'YS United States Patent Office 3,463,331
Patented Aug. 26, 1969

3,463,331
AUTOMATIC ASSEMBLY MACHINE
Frederick R. Neff, 2993 Curtis Ave.,
Des Plaines, Ill. 60018
Filed Apr. 12, 1968, Ser. No. 720,844
Int. Cl. B65g 59/00; B23p 19/00
U.S. Cl. 214—8.5                                    10 Claims

ABSTRACT OF THE DISCLOSURE

There is provided a device for loading a selected number of thin flat elements such as electrical spacers and the like from a supply chute. The loading device includes a guide surface and the supply chute defines an opening above the guide surface of sufficient size to discharge a selected number of spacers. Blade means are provided moving through the feed opening so that a desired number of blades corresponding to the number of spacers dischargable from the opening are effective to slide or move the spacers over the guide surface.

---

This invention relates to a spacer loading device, particularly to a device for feeding and loading a selectable number of small, flat elements such as electrical insulating spacers as may be used, for example, in a stack of contacts on a relay.

Heretofore difficulty has been experienced in the automatic feeding and loading of small thin elements such as electrical spacers due to variations in the thickness of the spacer and the like. Moreover where the spacers are used to provide a buildup in a stack of electrical contacts such as may be used on an electrical relay, it is necessary to provide for the desired spacer thickness by the bunching of one, two, three or perhaps more spacers at a time. Thus it is desirable for a spacer loading device to feed and load the desired number of spacers simultaneously and in a single cycle operation of a device.

Accordingly one object of the present invention is to provide a new and improved spacer loading device.

Yet a further object of the present invention is to provide an improved spacer loading device which may selectively feed and load a selected number of spacers simultaneously.

Yet a further object of the present invention is the provision of a spacer loading device which will accurately feed and load the selected number of spacers reliably without regard to variations in the manufacturing tolerances of the spacers.

Further objects and advantages of the present invention will become apparent as the following description proceeds and the features of novelty which characterize the invention will be pointed out with particularity in the claims annexed to and forming a part of this specification.

In accordance with these and many other objects of the present invention there is provided a new and improved spacer loading device for loading a selected number of thin, flat elements such as electrical insulating spacers and the like from a supply chute. The loading device includes a guide surface on which the spacers will fall by gravity through a supply chute. The lower end of the supply chute is spaced above the guide surface to define a feed opening. Manually controlled means are provided for adjustably selectively positioning the lower end of the supply chute above the guide surface a distance representative of the combined thickness of a desired number of elements to provide for the simultaneous discharge of the desired number of elements. Moreover the spacer loading device includes a plurality of spacer feed blades each movable in a blade track along the guide surface to the feed opening adapted simultaneously to push an element through the feed opening to a delivery area. Means are provided to drive a desired number of feed blades representative of the desired number of elements for movement during each stroke or cycle of the machine in relation to the vertical setting of the supply chute. Thus it will be understood that when the supply chute is selectively positioned above the guide surface to provide for the simultaneous feeding of a selected number of spacers, the same number of feed blades will be cycled to provide for the movement of the desired number of spacers.

For a better understanding of the present invention reference may be had to the accompanying drawings wherein:

FIG. 1 is a plan view of the spacer loading device according to the present invention illustrated with the feed blades in the retracted position between operating cycles of the device.

FIG. 2 is a perspective view of a typical spacer;

FIG. 3 is a plan view of a typical feed blade used in the device of FIG. 1;

FIG. 4 is a cross sectional elevational view of the spacer feeding device of FIG. 1, taken along line 4—4 of FIG. 1;

FIG. 6 is a fragmentary cross sectional view of the spacer feeding device in the position of FIG. 1, taken along line 6—6 of FIG. 1;

FIG. 8 is a fragmentary cross sectional view of the spacer feeding device of FIG. 1, taken substantially along line 8—8 of FIG. 1;

FIG. 9 is a detail view of a spacer pin illustrating the step of the removal of the spacers;

FIG. 10 is a fragmentary cross sectional view of a spacer pin of FIG. 9, illustrating a further detail of the assembly thereof; and FIG. 11 is a cross sectional view of a typical stack of spacers and switch components.

Figure 5:
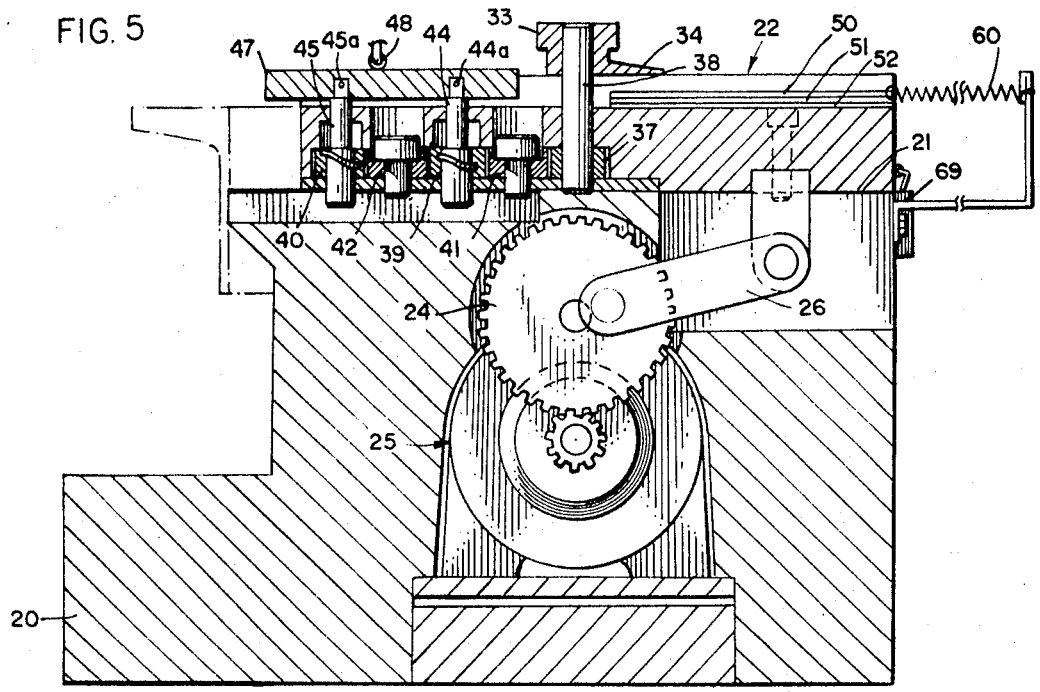
FIG. 5 is a cross sectional view of the spacer feeding device of FIG. 1, taken along line 5—5 of FIG. 1 representing the device in the retracted position illustrated in FIG. 1.

Referring now to the drawings, there is illustrated a spacer loading device generally illustrated at 10 in accordance with the present invention. The spacer loading device is adapted for feeding and loading small flat objects such as electrical insulating spacers 12, best illustrated in FIG. 2, onto a suitable spacer holding fixture 14.

Referring to the typical spacer 12 is illustrated in FIG. 2, the spacer 12 will have a plurality of transverse holes 16, generally two in number to provide for mounting screws or insulating sleeves, and are adapted to drop over spaced parallel prongs or pins 17 in the fixture 14. Thus a stack of spacers, switch elements and the like, illustrated as 18 in FIG. 11, can be built up onto the pins 17 of the fixture 14.

Figure 7:
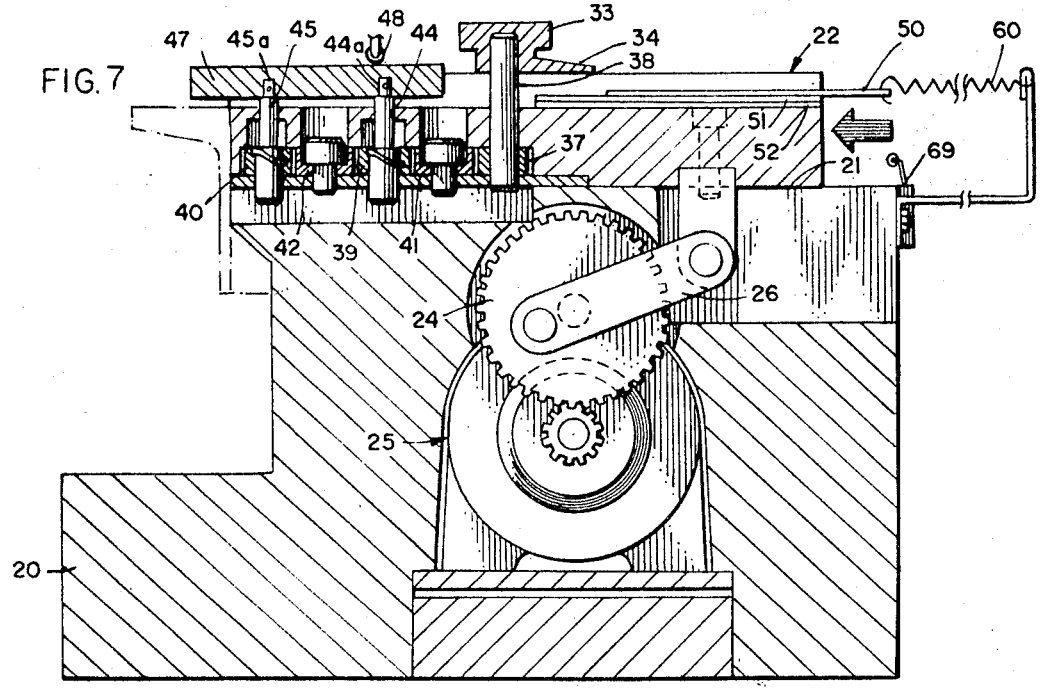
FIG. 7 is a cross sectional view of the spacer loading device of FIG. 1, taken substantially along line 5—5 of FIG. 1, illustrated with the carriage of the device in the advanced or feeding position.

The spacer loading device 10 includes a base or frame 20 having a track 21 on which is mounted a movable carriage 22. The carriage 22 is reciprocated through a single forward and reverse stroke for each operating cycle thereof by means of a suitable drive motor 23 operatively connected to an eccentric 24, FIGS. 5 and 6, through a suitable clutch and brake assembly 25. In the illustrated embodiment the clutch and brake assembly 25 are combined in a unitary frame; however it is understood that they may be entirely separate components if desired. The eccentric 24 is connected to the carriage 22 through a crank or connecting rod 26. A single cycle of operation of the spacer loading device will drive the carriage 22 forward, or to the left as viewed in FIG. 5 to the advanced position illustrated in FIG. 7, and thence to return to the at rest position of FIG. 5.

To provide for the supply of spacers 12, there is provided suitable supply chute 28, the lower end of which is spaced above a guide surface 29, FIGS. 1 and 6, to define a feed opening 30 for discharging or feeding the spacers 12. The chute 28 is vertically adjustable relative to the guide surface 29 to provide a selectively variable feed opening accommodating the desired number of spacers 12 to be fed during each operation of the device.

For adjusting the lower end of the chute 28 vertically relative to the guide surface 29, there is provided a control and cam assembly carried by the carriage 22 including a manually settable knob 33 having a pointer 34 settable to suitable indicia 35 representing the number of spacers 12 to be fed in each cycling of the spacer loading device 10. The knob 33 is connected to a suitable gear 37 by a shaft 38. The gear 37 in turn drives a gear train including a pair of screw gears 39 and 40, the inner hub of which defines a suitable screw thread, interconnected by idling gears 41 and 42. The screw gears 39 and 40 are fixed against vertical movement in the carriage 22, but of course are mounted for rotation on the carriage. A pair of drive screw shafts 44 and 45 extend through the screw gears, and are provided with a suitable complementary screw thread cooperating with the screw threads on the screw gears 39 and 40. The drive screw shafts 44 and 45 are fixed against rotation, as by the provision of upper square ends 44a and 45a. The upper ends of the drive screw shafts 44 and 45 support a cam track 47. A cam follower, here in the form of a cam roller 48, rides on the cam track 47 and is fixed for vertical movement with the housing of the chute 28 controlling the size of the lower feed opening 30.

In operation the size of the feed opening 30 is regulated by the manual setting of the manually settable knob 33 whch can be set with the pointer 34 thereof indexed with one of the desired indicia representing the number of spacers to be fed, which, in the illustrated embodiment, may be one, two or three. Adjustment of the knob 33 is effective to rotate the gears 37, 39, 40, 41 and 42 which in turn is effective to raise and lower the drive screw shafts 44 and 45. These in turn control the vertical level or height of the cam track 47. The vertical level of the cam track 47 is related back to the feed opening 30 through the cam roller 48 which regulates the vertical positioning of the chute 28 in response to the vertical setting of the cam track 47.

To provide for the drive of the respective spacers 12 along the guide surface 29, there is provided a plurality of similar drive blades 50, 51 and 52, a representative one of which is illustrated in FIG. 3. Referring to blade 50 of FIG. 3, each of the blades is provided with a drive portion 50a having a somewhat fork- or U-shaped forward end 50b conforming to the shape of the spacer 12 for engaging and driving the spacer along the guide surface 29. Moreover each of the drive blades is provided with a square opening for receiving the square upper end of a blade engaging shaft 56, FIGS. 1 and 6. The blade engaging shaft 56 is provided with a screw thread 56a received in the inner hub of a screw gear 58 in operative association with the idler gear 41. The screw gear 58 is fixed against vertical movement; the blade engaging shaft 56 is fixed against rotation through the engagement of the square upper end in the square opening 55. Thus it will be understood that manual setting of the knob 33 will be effective to rotate the screw gear 58, thus varying the vertical elevation or position of the blade engaging shaft 56. With the knob 1 set to feed a single blade, the blade engaging shaft 56 will engage only the lowermost one 52 of the blades. However when the knob 33 is set to feed two spacers, the blade engaging shaft 56 will be moved vertically sufficiently to engage the two lowermost ones 51 and 52 of the blades. With the knob 33 set to feed three spacers, the blade engaging shaft 56 will be moved vertically to engage within the respective openings of all of the blades 50, 51 and 52. Thus with the manual setting of the knob 33, the blade engaging shaft 56 is set to drive one, two or three of the blades.

To restrain the blades not driven during a feeding operation, at least the uppermost ones of the blades 50, 51 and 52 are provided with suitable spring openings 59, FIG. 3; and suitable tension springs 60, 61 restrain movement of the blades 50 and 51 respectively when they are not driven through an operating cycle. The lowermost one of the blades 52 is driven through an operating stroke upon each cycling of the spacer loading device and, therefore, need not be restrained from movement with the carriage 22.

From the above brief description, it will be understood that in operation the knob 33 is manually set to the desired number of spacers which is desired to be fed in each operating cycle of spacer setting device 10. In the illustrated embodiment the knob 33 has been set to feed two spacers. Setting of the knob 33 performs two functions: first the knob acts through the gears 37, 39, 40, 49 and 42 to regulate the height of the cam track 47, thereby to adjust the feed opening 30 to permit discharge of one, two or three spacers; and secondly acting through the gears 37 and 38 to adjust or select the number of blades which are to be driven through a cycling or feed stroke upon each cycling of the machine. The spacers 12 are fed forward, or to the left as viewed in FIGS. 5 and 7, so as to drop through a spacer opening 63, FIGS. 1 and 6, and onto the pins 17 of the fixture 14.

The fixture 14 is designed to accommodate a number of spacers 12, thereafter to recive suitable spring or contact leaves 62, and additional spacers and other elements as required for a particular stack 64 of contacts. The built up stack 64 is particularly adapted for use on small relays. To this end, the upper ends of the pins 17 are somewhat smaller in diameter than the holes 16 in the spacers 12. After the stack 64 has been completed, an insulating bushing 65 of sufficient size to be a slight press fit into the holes 16, is fitted over the pins 17 and pressed through the stack 64, as illustrated in FIG. 9. The pins 17 may then be retracted and the bushing 65 will serve to hold the stack 64 assembled as illustrated in FIGS. 10 and 11.

It will be understood that there may be provided a large number of the fixtures 14, if desired, so that the fixtures 14 may be moved from machine to machine as it is desired to load a different number of spacers or contact springs thereon. Alternatively the entire assembly may be made at a single machine, the manually settable knob 33 being set for each series of different number of spacers required. In the event that more than three spacers, are required from a machine of the type illustrated in the attached drawings, such as the set of six spacers in FIGS. 9 through 11, the spacer loading device 10 may be cycled twice to provide two stacks of three spacers each.

The illustrated spacer loading device 10 is cycled automatically first by the placement of the spacer holding fixture 14 into position which, in turn, actuates a microswitch 68, FIG. 6, effective to release the brake of the clutch and brake assembly 25 and engage the clutch 25 thereof. This begins a cycle of operation of the spacer loading divice 10. The spacer loading device 10 will automatically cycle to move the carriage 22 forwardly to feed the desired number of spacers, and to return the carriage rearwardly to the position illustrated in FIG. 5. At this point the carriage 22 will engage and activate a microswitch 69 effective to release the clutch and engage the brake of the clutch and brake assembly 25.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A loading device for loading a selected number of thin flat elements such as electrical spacers and the like from a supply chute, said device including:
   a guide surface;
   a supply chute having a lower end spaced above said guide surface to define a feed opening;
   adjustable means selectively positioning the lower end of said supply chute above said guide surface a distance representative of the combined thickness of a desired number of elements to provide for the simultaneous discharge of a desired number of elements;
   a plurality of spacer feed blades each movable in a blade track having a feeding portion reciprocable along said guide surface through said feed opening each adapted simultaneously to push an element through said feed opening to a delivery area; and
   selector means selectively driving a desired number of said feed blades representative of the desired number of elements through said feed opening in relation to the vertical setting of said adjustable means.

2. A loading device as set forth in claim 1 wherein said adjustable means includes a vertically adjustable cam track, and a cam follower secured to said chute which rides on said track to provide for positioning said chute relative to said guide surface.

3. A loading device as set forth in claim 2 wherein said adjustable means includes adjusting gear means fixed against vertical movement, said gear means having an inner threaded hub and screw shaft means fixed against rotational movement, said screw shaft means threaded in cooperative association with said gear means, said screw shaft means supporting said cam track, and setting means for turning said gear means a selected amount to provide the desired size of feed opening.

4. A loading device as set forth in claim 3 wherein said setting means includes a manually adjustable member, and gear train means interconnecting said adjustable member and said gear means.

5. A loading device as set forth in claim 1 wherein said feed blades are provided with normally aligned drive openings, and wherein a drive screw shaft extends into at least one of said drive openings, said drive screw shaft being fixed against rotation, and gear means fixed against vertical movement having an inner hub threaded on said drive screw shaft, and setting means for turning said gear means a selected amount to extend said drive screw shaft into the drive opening of a selected number of drive blades.

6. A loading device as set forth in claim 5 wherein said setting means includes a manually adjustable member, and gear train means interconnecting said adjustable member and said gear means.

7. A loading device as set forth in claim 3 wherein said setting means includes a manually adjustable member; gear train means interconnecting said adjustable member and said gear means, said feed blades being provided with normally aligned drive openings, drive screw shaft means extending into at least one of said drive openings, said drive screw shaft means being fixed against rotation, and gear means fixed against vertical movement having an inner hub threaded on said drive screw shaft means; and manually adjustable means for turning said gear means a selected amount to extend said drive screw shaft into the drive opening of a selected number of drive blades.

8. A loading device as set forth in claim 7 including a movable carriage, said screw shaft means and said drive screw shaft being mounted on said carriage for movement therewith.

9. A loading device as set forth in claim 8 including biasing means restraining such of said drive blades as are not engaged by said drive screw shaft from movement therewith.

10. A loading device for loading a selected number of thin flat elements such as electrical spacers and the like from a supply chute, said device including:
    a guide surface;
    a supply chute having a feed opening defined above said guide surface;
    adjustable means selectively varying the size of said feed opening to provide for the simultaneous discharge of a selected number of elements;
    a movable feed carriage;
    first feed blade means movable with said carriage over said guide surface to feed a first one of said elements;
    additional feed blade means selectively movable with said carriage to feed a selected additional number of elements simultaneously with said first one of said elements; and
    setting means simultaneously selecting said adjustable means to discharge a desired number of elements and the desired number of said additional feed blade means to provide for the feed of the same number of elements.

References Cited

UNITED STATES PATENTS 2,509,622    5/1950    Woolcott _____ 214—8.5
2,680,510    6/1954    Donath _____ 214—8.5

GERALD M. FORLENZA, Primary Examiner

G. F. ABRAHAM, Assistant Examiner

U.S. Cl. X.R.

133—4, 5; 221—241